US006385008B1

(12) United States Patent
Santini et al.

(10) Patent No.: US 6,385,008 B1
(45) Date of Patent: May 7, 2002

(54) REDUCTION OF MAGNETIC SIDE WRITING IN THIN FILM MAGNETIC HEADS USING NEGATIVE PROFILED POLE TIPS

(75) Inventors: Hugo Alberto Emilio Santini, San Jose; Brian Troy, San Luis Obispo, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,441

(22) Filed: Dec. 16, 1999

(51) Int. Cl.$^7$ ................................................ G11B 5/187
(52) U.S. Cl. ....................................................... 360/126
(58) Field of Search ................................. 360/126, 122, 360/121, 119, 317; 29/603

(56) References Cited

U.S. PATENT DOCUMENTS

| | | | |
|---|---|---|---|
| 4,351,698 A | 9/1982 | Osborne | 156/661.1 |
| 4,951,166 A * | 8/1990 | Schewe | 360/119 |
| 4,970,615 A | 11/1990 | Gau | 360/122 |
| 4,970,616 A | 11/1990 | Ramaswamy | 360/122 |
| 5,116,719 A | 5/1992 | Gau | 430/313 |
| 5,126,232 A | 6/1992 | Gau | 430/320 |
| 5,137,750 A | 8/1992 | Amin et al. | 427/116 |
| 5,267,112 A | 11/1993 | Batra et al. | 360/119 |
| 5,283,942 A | 2/1994 | Chen et al. | 29/603.18 |
| 5,285,340 A | 2/1994 | Ju et al. | 360/119 |
| 5,296,979 A | 3/1994 | Kawabe et al. | 360/97.01 |
| 5,349,745 A | 9/1994 | Kawabe et al. | 29/603.18 |
| 5,462,637 A | 10/1995 | Thiele | 216/22 |
| 5,695,656 A * | 12/1997 | Park et al. | 216/22 |
| 5,719,730 A | 2/1998 | Chang et al. | 360/317 |
| 5,809,637 A | 9/1998 | Rottmayer | 29/603.15 |
| 5,874,010 A * | 2/1999 | Tao et al. | 216/22 |
| 5,901,431 A | 5/1999 | Santini | 29/603.14 |
| 5,949,625 A * | 9/1999 | Sato et al. | 360/122 |
| 6,199,267 B1 * | 3/2001 | Koshikawa et al. | 29/603.15 |

OTHER PUBLICATIONS

"Three Dimensional Simulation of Side Writing Field and Crosstalk for Thin Film Heads with Various Pole Shapes" by T. Iwakura, et al., International Conference on Magnetics, Apr., 1989, Washington, D.C.

"Three Dimensional Simulation of Side Writing Field and Crosstalk for Thin Film Heads with Various Pole Shapes" by T. Iwakura, et al., IEEE Transactions on Magnetics, vol. 23, No. 5, Sep. 1989.

* cited by examiner

*Primary Examiner*—David Davis
*Assistant Examiner*—Angel Castro
(74) *Attorney, Agent, or Firm*—Robert O. Guillot; Oppenheimer Wolff & Donnelly LLP

(57) ABSTRACT

The magnetic writing head of the present invention includes a P2 pole tip having a novel profile. This profile, as viewed from the air bearing surface (ABS) can generally be described an hour glass shape in that the minimum width of the pole tip is disposed away from the base of the P2 pole tip. The negative profile results in a significant reduction in magnetic side writing that emanates from the write head. A novel method for producing the negative profiled pole tip involves control of the photoresist processing parameters and pole tip plating parameters. Specifically, the photoresist is baked at particular temperatures for particular periods of time, such that the cross linking within the photoresist is produced to the extent that the photoresist will controllably swell during the plating operation. The result is that as the P2 pole tip is plated, the photoresist swells to cause the negative profile along the thickness of the pole tip.

14 Claims, 6 Drawing Sheets

REDUCTION OF MAGNETIC SIDE WRITING IN THIN FILM MAGNETIC HEADS USING NEGATIVE PROFILED POLE TIPS

BACKGROUND OF THE INVENTION

1. Field of the Invention

The present invention relates generally to magnetic pole tip configurations for magnetic write heads, and more specifically to pole tip configurations that reduce magnetic side writing.

2. Description of the Prior Art

For very high density magnetic recording it is necessary to record magnetic domains very close together. The bit packing is done in both the linear direction (Bits per Inch (BPI)) and in the radial direction (Tracks per Inch (TPI)). The TPI is generally determined by two parameters, the size of the written bit that is primarily determined by the second pole tip's lateral dimension (P2W), and the inter-track guard band that is mostly composed of magnetic noise. The width of the inter-track band is determined by how well the drive can servo, the accuracy of the actuator system, and by the extent of the side writing of the poles. The side writing is one of the easier parameters to control, and reduce, because it is an intrinsic function of the way pole tips are constructed.

To reduce side writing, pole tips of various shapes have been developed, such as rectangular and trapezoidal shapes. Additionally, write heads have been developed that include a notched first pole tip, as described in U.S. Pat. No. 5,901,432, in an effort to reduce sidewriting. As the width of the base of the P2 pole has been reduced, in order to produce narrower track widths, the effect of side writing has become more pronounced in relation to the narrowed track widths. The side writing produced by the P2 pole tips therefore requires further reduction, and the P2 pole tip of the present invention, with its negative profile, provides such a side writing reduction.

SUMMARY OF THE INVENTION

The magnetic writing head of the present invention includes a P2 pole tip having a novel profile. This profile, as viewed from the air bearing surface (ABS) can generally be described an hour glass shape in that the minimum width of the pole tip is disposed away from the base of the P2 pole tip. The negative profile results in a significant reduction in magnetic side writing that emanates from the write head.

A novel method for producing the negative profiled pole tip involves control of the photoresist processing parameters and pole tip plating parameters. Specifically, the photoresist is baked at particular temperatures for particular periods of time, such that the cross linking within the photoresist is produced to the extent that the photoresist will controllably swell during the plating operation. The result is that as the P2 pole tip is plated, the photoresist swells to cause the negative profile along the thickness of the pole tip.

It is an advantage of the present invention that a magnetic write head has been developed that produces reduced magnetic side writing.

It is another advantage of the present invention that a magnetic pole tip has been developed that produces reduced side writing with no additional manufacturing steps over the existing manufacturing methods.

It is a further advantage of the present invention that an improved magnetic write head has been developed that is simple to manufacture.

It is yet another advantage of the present invention that the manufacturing method for a magnetic write head has been developed which produces an improved write head with no additional manufacturing steps.

These and other features and advantages of the present invention will become well understood by those skilled in the art upon reading the following detailed description which makes reference to the several figures of the drawings.

IN THE DRAWINGS

DETAILED DESCRIPTION OF THE PREFERRED EMBODIMENTS

Figure 1:
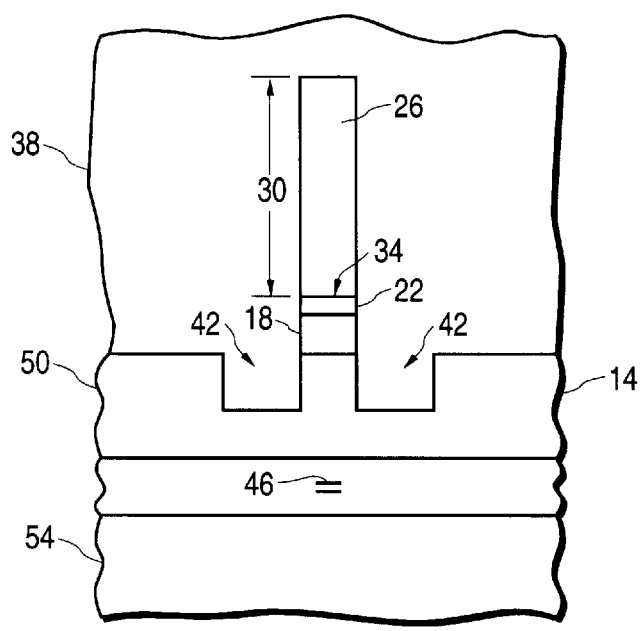
FIG. 1 is a plan view of a prior art merged thin film magnetic head having a notched P1 pole.

Various attempts have been made to reduce side writing from thin film magnetic heads in order to increase the areal density of data written on magnetic disks. Recent advances in write head designs include the prior art notched pole tip design depicted in FIG. 1, from which the novel features and advantages of the present invention can be advantageously explained. The notched write head of FIG. 1 is described fully in the inventor's prior U.S. Pat. No. 5,901,432 and is briefly described herein. As depicted in FIG. 1, the prior art head 10 includes a P1 pole 14, a write gap layer 18, a seed layer 22 and a P2 pole tip 26 having a thickness 30 that is significantly greater than its base width 34; these components being formed within an encapsulating layer 38. To reduce side writing between the P2 pole tip 26 and the P1 pole 14, notches 42 are etched into the P1 pole 14. Such heads 10 typically are formed to include a read head portion 46 disposed between shield layers 50 and 54. Where the shield layer 50 also serves as a pole, such as P1 pole 14, the head 10 is termed a merged head.

In manufacturing the prior art notched pole 14 depicted in FIG. 1, the P1 layer is deposited, followed by the gap layer 18 having a thickness of approximately from 900 Å to 3,000 Å, depending upon the size of the data bits, and therefore the bits per inch (BPI) areal density to be written by the write head 10. A seed layer 22 of approximately 800 Å is deposited upon the gap layer 18 and the P2 pole tip 26 is plated onto the seed layer 22. Typically, where the P2 pole tip width is approximately 0.5 microns, the thickness of the P2 pole tip will be initially plated up to approximately 4 microns thick. The P2 pole tip trench that is formed in the photolithographic resist layer, that is created to plate up the P2 pole tip, will then typically have a thickness of approximately 4.5 microns. Therefore, the aspect ratio of the prior art P2 pole tip trench is approximately 9 to 1 (thickness to width), which can create difficult plating problems, as is known to those skilled in the art. After the P2 pole tip has been plated up within the photoresist trench, the photoresist is removed using a wet chemical removal process. Then, using ion beam etching techniques with suitable masking techniques, the pole tip area is etched using the P2 pole tip as part of the mask, such that the seed layer 22, gap layer 18 and portions of the P1 pole 14 are removed to create the notches 42, as depicted in FIG. 1. Typically, the depth of notching is approximately 1.5 to 2 gap thicknesses. The portions of the seed layer 22 and gap layer 18 located beneath the P2 pole tip 26 are not removed due to the shielding thereof by the P2 pole tip.

The ion etching process is typically conducted at an angle of approximately 10° from normal to perform the material etching process and at an angle of approximately 70° from normal to clean up material that becomes redeposited along the sides of the gap layer 18, seed layer 22 and P2 pole tip 26 during the etching process. This necessary removal of redeposited material can present a problem, because if the etching at the 70° angle is too great the P2 pole tip width can be reduced, whereas if the etching at the 70° angle is not sufficient then redeposited material will remain on the sides of the gap layer 18 and other side surfaces, which can lead to device performance problems.

Figure 2:
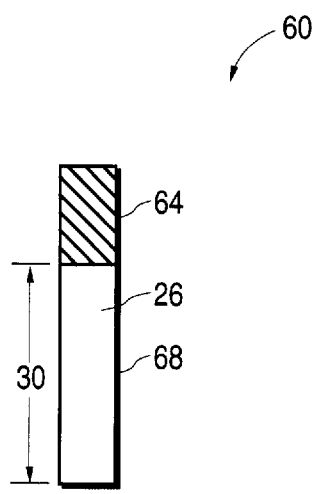
FIG. 2 is a plan view depicting the effect upon the prior art P2 pole tip of ion beam etching undertaken to create the prior art head depicted in FIG. 1.

The etching process step that is undertaken to notch the P1 pole 14 also significantly reduces the thickness of the initially plated P2 pole tip. Specifically, as depicted in FIG. 2, where the initially plated pole tip 60 has a thickness of approximately 4 microns, as a result of the etching step, a significant upper portion 64 of the pole tip 60 is etched away, such that the thickness of the remaining portion 68 of the P2 pole tip corresponds to thickness 30 of the P2 pole tip 26 of approximately 2.5 microns. As will be understood by those skilled in the art after reading the following detailed description of the present invention, the P2 pole tip manufacturing process of the present invention does not require a notched P1 pole tip. Thus, the etching step of the prior art is not required, and, significantly, it is not necessary to plate up the P2 pole tip to a height such as 4 microns, and then to etch away the top portion of it. Therefore, the photolithographic trench for plating the P2 pole tip of the present invention is not as deep as the trench of the prior art P2 pole tip 60, thus simplifying the P2 pole tip plating process.

Figure 3:
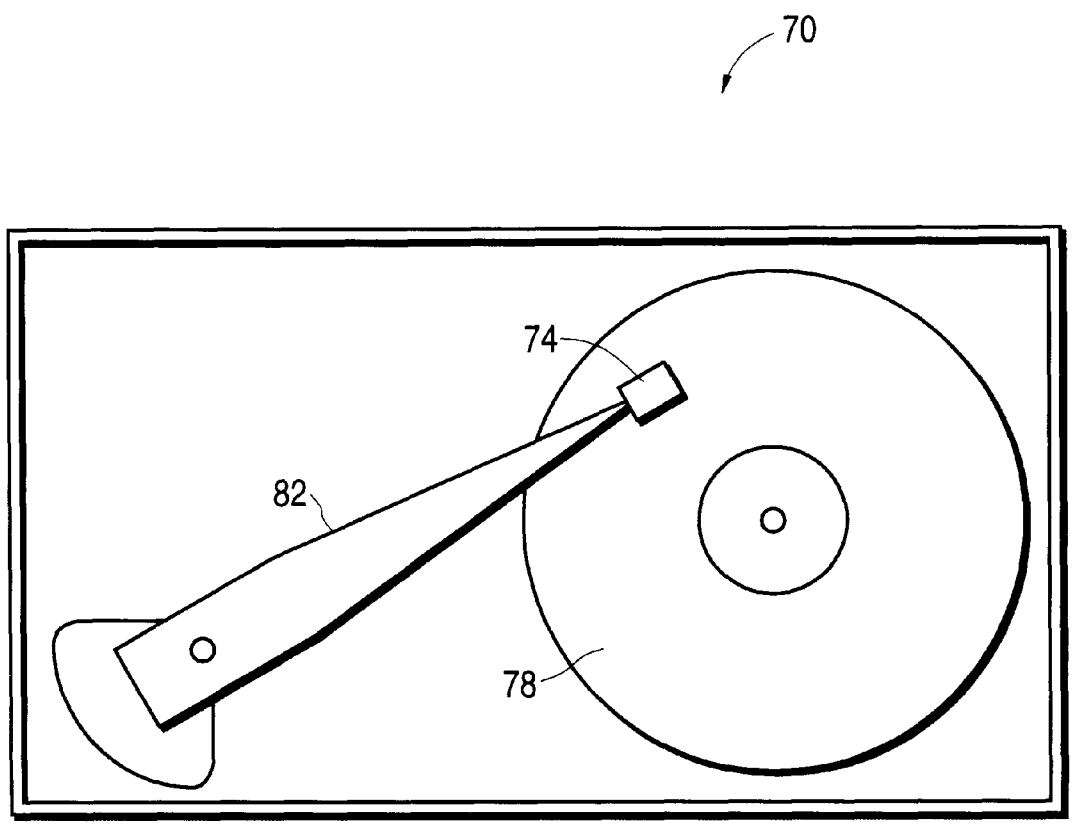
FIG. 3 is a plan view of a hard disk drive including the magnetic head of the present invention.

A simplified depiction of a disk drive 70 that includes the thin film magnetic head 74 of the present invention is presented in FIG. 3. The disk drive 70 includes one or more hard disks 78, one or more actuator arms 82 that have a magnetic head 74 of the present invention mounted thereto, together with additional electromechanical and computerized components (not shown) that are well known in the hard disk drive prior art.

Figure 4:
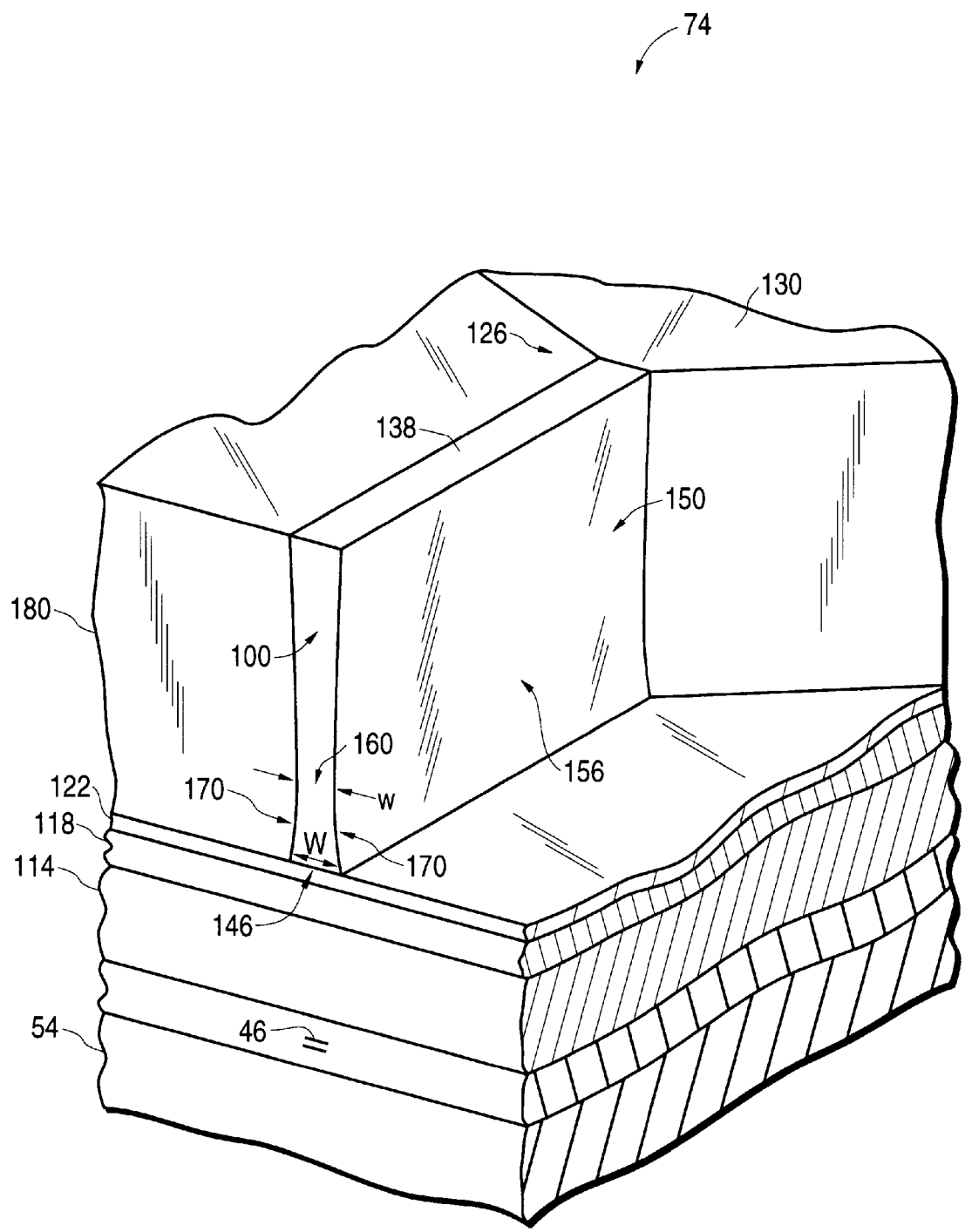
FIG. 4 is a perspective view with cut-away portions that depicts the magnetic head of the present invention.
Figure 5:
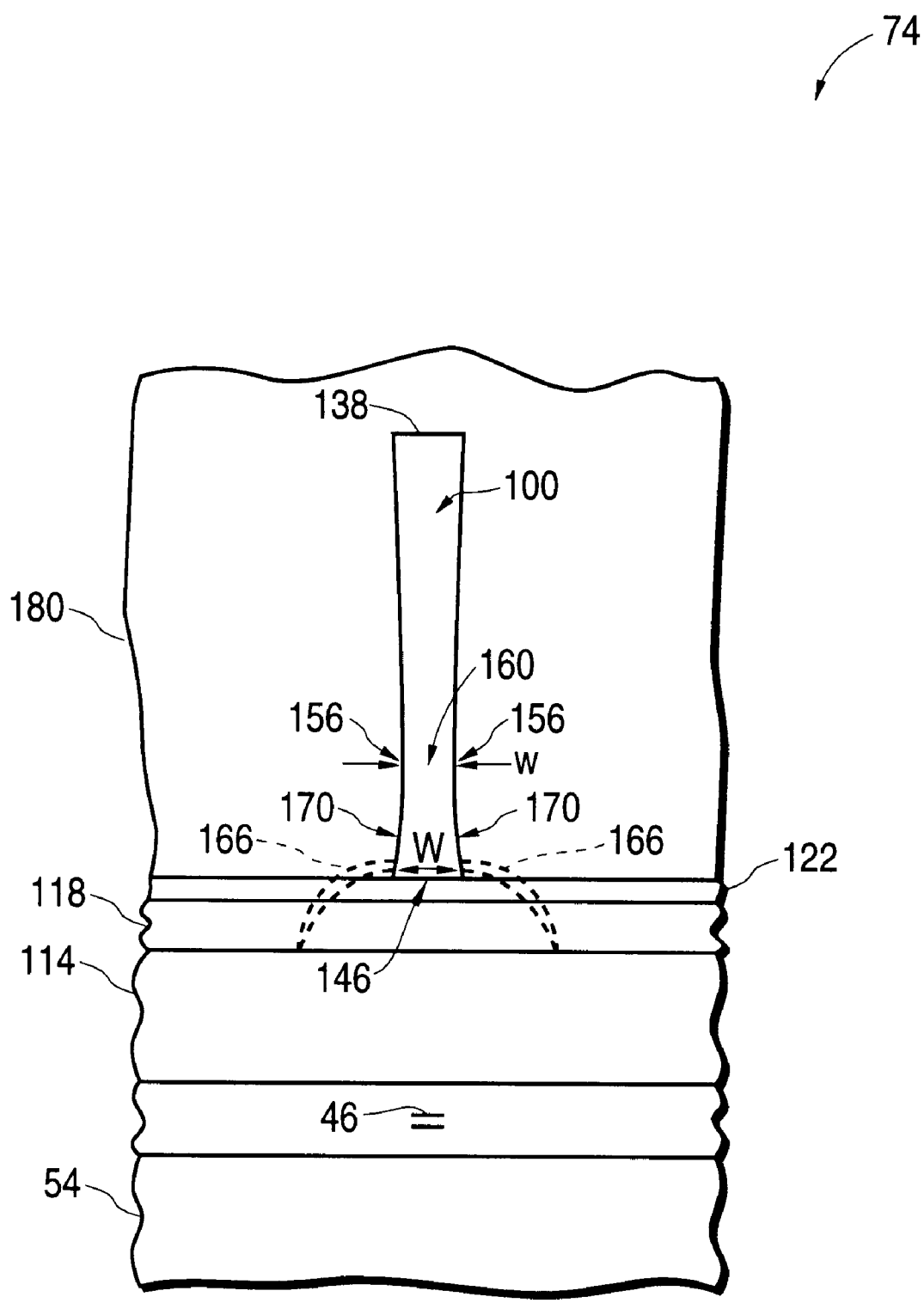
FIG. 5 is a plan view of the magnetic head of the present invention taken from the ABS surface side.

A merged magnetic head 74 of the present invention is depicted in FIGS. 4 and 5, wherein FIG. 4 is a perspective view with cut-away portions that depicts the novel profile of the P2 pole tip 100, and FIG. 5 is an ABS surface plan view of the P2 pole tip 100. The write head portion of the magnetic head 74 includes a first pole layer (P1) 114, that is typically formed by plating, a gap layer 118 having a thickness G that is deposited upon the P1 layer 114, a seed layer 122 that is deposited upon the gap layer 118, and a P2 pole 126 that is plated onto the seed layer 122 in a process that is described in detail herebelow. The P2 pole 126 has a back portion (yoke) 130 and a P2 pole tip 138 that is formed with an ABS surface profile that includes a pole tip base (P2B) 146 having a width W and two sides 150 that each include an indentation 156, such that a distinctive reduction in width along the thickness of the ABS surface profile exists, thereby creating an hour glass, necked shape having a minimum width w disposed at a point 160 away from the P2B base 146. This "hour glass" profile, also referred to as a negative profile, has been demonstrated to produce significant side writing reduction because the fringing magnetic fields 166 (see FIG. 5) start from receding lateral surfaces 170 of the indentations 156 of the pole tip 138. Even where the P1 pole tip 114 is much wider than the width W of the base 146 of the P2 pole tip 138 the reduction in side writing is significant.

The disclosed P2 pole tip ABS surface profile is controllably produced in a preferred manufacturing embodiment using a negative resist process. It has been found that the negative resist material properties, with its polar resin stabilized via chemically enhanced cross linking, can be manipulated towards producing such a plated profile in the ABS surface of P2 pole tip 138. This result is unexpected because the profile is not present at the photoresist level. Instead, the preferred plated profile is produced by controllably allowing the resist to change its lateral dimensions while the plating process takes place. The novel steps in the process of the present invention are explained with the aid of FIGS. 6 and 7, wherein FIG. 6 is a perspective view with cut-away portions of the photoresist profile for the P2 pole tip 138 of the present invention, and FIG. 7 is a plan view of the ABS surface side of the photoresist profile depicted in FIG. 6.

Figure 6:
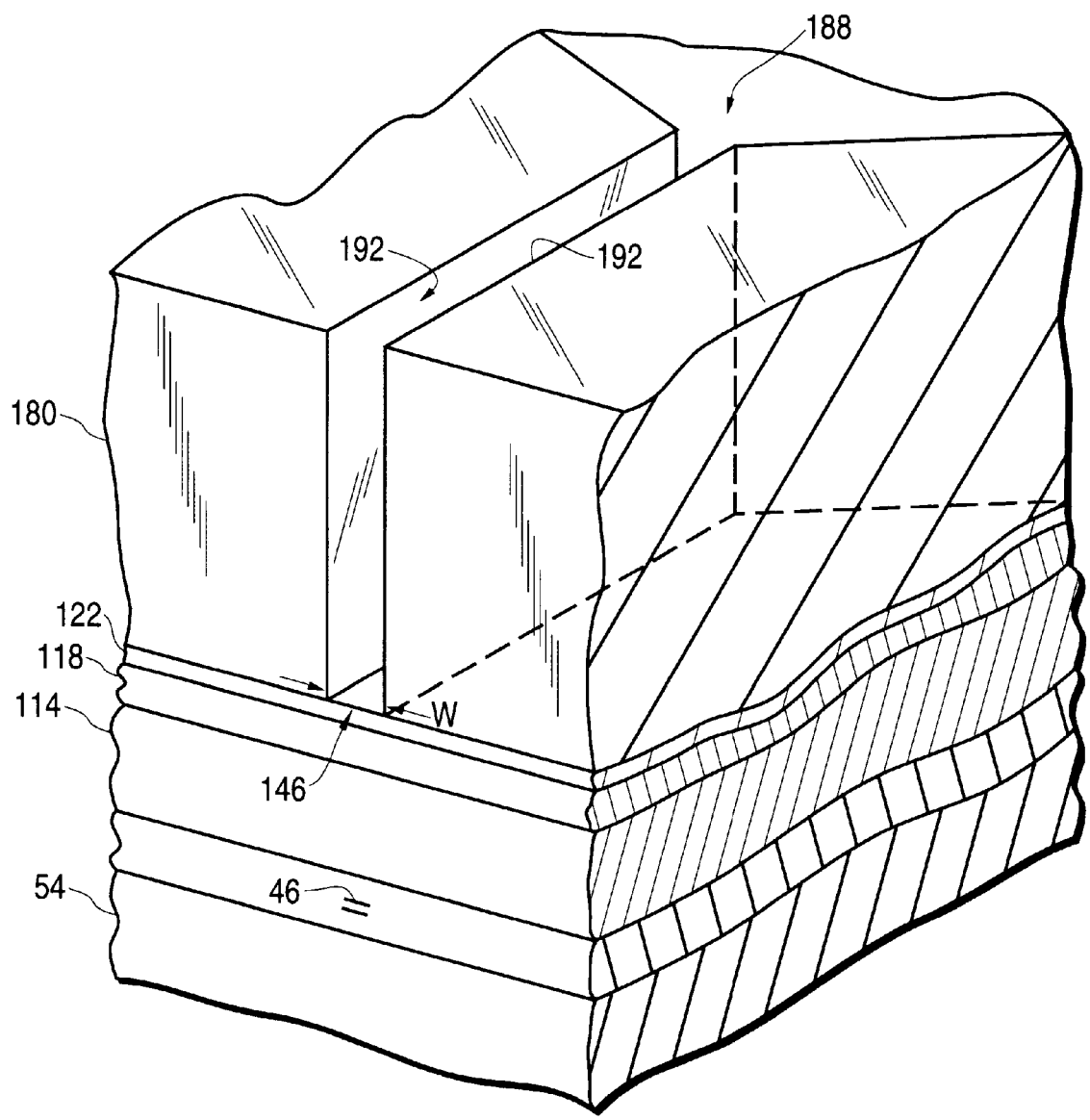
FIG. 6 is a perspective view with cut-away portions of the photoresist profile for the P2 pole tip depicted in FIG. 4.
Figure 7:
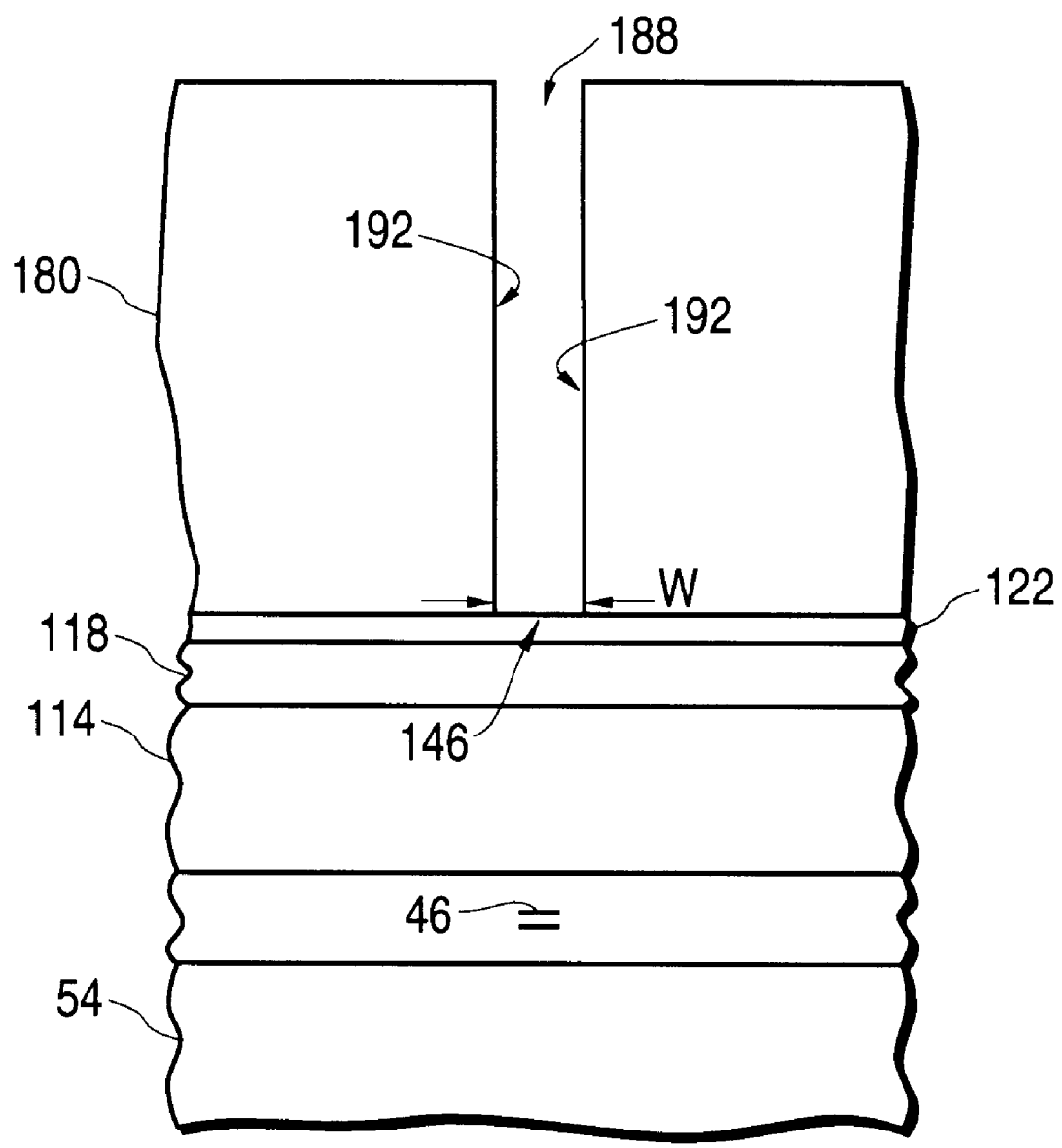
FIG. 7 is a plan view of the photoresist profile depicted in FIG. 6 taken from the ABS surface side.

As depicted in FIGS. 6 and 7, the manufacturing process of the magnetic head of the present invention has proceeded with the formation of the P1 pole layer 114 with the gap layer 118 having been deposited thereon to a thickness G, and with a seed layer 122 having been deposited upon the gap layer 118. A photoresist layer 180 has been deposited upon the seed layer 122. As is well known, the bottom portions (not shown for ease of depiction) of the photoresist layer 180 as well as the bottom portions (not shown) of the P1 pole layer 114, gap layer 118 and seed layer 122 extend downwardly during manufacturing, and are later removed to establish the ABS surfaces depicted in FIGS. 4 and 5. Following the deposition of the photoresist layer 180, a standard photo exposure step is conducted, followed by a typical two step baking cycle (soft bake and post exposure bake), followed by a developing step in which the unexposed photoresist is chemically removed. FIGS. 6 and 7 depict the photoresist layer 180 following the bake cycle and the removal of unexposed photoresist which then creates the photoresist trench profile 188 for the hour glass shaped P2 pole tip 138 of the present invention. As depicted in FIGS. 6 and 7, the photoresist trench 188 includes straight, flat side walls 192 for the plating process that will produce the hour glass shaped P2 pole tip 138. It is noteworthy that the straight, flat sidewalls 192 facilitate the measurement of the P2W pole tip width W prior to the plating operation, which can be measured very precisely utilizing a top down scanning electron microscope or similar tool.

It is therefore to be understood that the hour glass shaped P2 pole tip 138 of the present invention is controllably formed in a plating process that utilizes a photoresist profile that initially has straight, flat sidewalls 192. The sidewalls 192 are thereafter controllably allowed to change shape, by absorption of the plating solution during the plating process. The sidewall 138 by an inward swelling of the sidewalls 192 during the P2 pole tip plating process, as is next discussed.

The polar resin of the photoresist 180 and its solvent contribute to the controlled absorption of the plating solution (typically $H_2O/H_2SO_4$) and its surfactant formulation, as is commonly used in the art. The degree of swelling of the resist 180 is controlled in the present invention by the amount of cross linking that is created in the negative resist by the photo initiation generation of acid, and the degree of cross linking developed during the post exposure bake cycle. Specifically, the bake time t and bake temperature T of the post exposure bake step are selected to control the amount of fluid the resin can accommodate, which is reflected in the amount of swelling and thus lateral necking 160 on the pole tip 138. Experimentation has shown that for a short post exposure bake time t of approximately 5 min. at relatively low bake temperature T of approximately 95 degrees C. the amount of lateral necking 160 is approximately 0.15 μm per edge. The necking 160 will reduce to approximately 0.5 μm if the post exposure bake temperature T is increased to 105 deg. C., or if the post exposure bake time t is, extended to 30 mins. For a 105 deg. C. post exposure bake temperature that is 30 min. in length, the amount of swelling in the resist is no longer measurable. The general range of necking 160 of each side edge is preferably in the range of 2.5% to 20% of W with a preferred necking of approximately 15% of W per side edge. It is obvious that the amount of swelling can not be so large as to cause closure of the open space profile where the pole tip 138 is formed, so the amount of swelling for extremely small pole tip widths W must controlled to be less than for larger pole tip widths.

The location of the necking 160, and the amount of necking can be further controlled by controlling the plating rate P. That is, where a relatively slow plating rate is utilized, the degree of swelling will be maximized and the location of the maximum necking 160 (minimum width w) will be closest to the P2B pole tip base 146. Conversely, where the plating rate is more rapid, the maximum necking point 160 will tend to be higher; that is, away from the P2B pole tip base 146. For a deposition rate of 400 Å/min. the point of maximum necking 160 is located approximately 0.3 microns away from the seed layer, at 600 Å per minute the maximum necking point 160 is located approximately 0.6 microns from the seed layer, at 800 Å per minute the point 160 is approximately 0.9 microns from the seed layer, and at approximately 1,000 Å per minute the maximum swelling point is approximately 1.2 microns from the seed layer. In examining the relationship between side writing and the location of the maximum necking, it appears that minimal side writing occurs where the point 160 of minimum necking width w is located at one to five gap thickness G away from the P2B base 146, with a preferred location at two to three gap thicknesses. For instance, where the gap layer thickness is 0.3 microns, maximum necking is preferred at approximately 0.6 microns from the seed layer, and a deposition rate of approximately 600 Å per minute is indicated.

Because the negative profiled P2 pole tip of the present invention significantly reduces sidewriting, the P1 notching step of the prior art device described hereabove is no longer required ,in order to achieve the same areal data storage density. Therefore, it is not necessary to plate the P2 pole tip 138 of the present invention to an increased thickness in order for it to be subsequently etched away, as depicted in FIG. 2 and described hereabove, to a final desired thickness. Rather, the thickness of the resist 180, and therefore the depth of the trench 188 into which the P2 pole tip of the present invention is plated can be significantly reduced. Specifically, where a P2 pole tip base width W of 0.5 microns, and a P2 pole tip thickness of 2.5 microns is desired, a resist trench 188 having a depth of approximately 3.0 microns is suitable. Such a trench will have an aspect ratio of approximately 6 to 1 (thickness to width) as compared to the prior art P2 pole tip trench with its aspect ratio of 9 to 1 (as described hereabove). Therefore, the P2 pole tip plating process of the present invention is somewhat easier to accomplish because the aspect ratio of the P2 pole tip trench can be reduced. Additionally, implementation of the necked profile P2 pole tip 138 of the present invention facilitates the use of generally narrower pole tip widths with acceptable side writing minimization because the P1 pole tip notching ion etch step, which can have a significant impact upon a narrow width pole tip, is not performed. In this regard, a preferred embodiment of a plated pole tip 138 has been experimentally demonstrated as having a 0.28 micron width W at the P2B base with a negative profile of 0.05 microns per edge maximum necking point 160 occurring at a 0.6 microns of the 3.0 micron total thickness of the pole tip 138. A significant advantage of the negative profile method and design described herein to the prior art is the simplicity of processing, the use of a thinner resist layer 180, together with a lower aspect ratio of the plating trench 188, and the availability of measurement of the P2W pole tip width W prior to plating.

While the plating process described hereinabove utilizes a negative photoresist to obtain the sidewall swelling during the plating process, there is no apparent reason why a positive photoresist process cannot be implemented, and the present invention is therefore not to be limited to the use of negative photoresist to achieve the sidewall swelling during the plating process that results in the hour glass shaped P2 pole tip profile of the present invention.

While the invention has been shown and described with reference to various preferred embodiments, it is to be understood that those skilled in the art will no doubt develop various alterations and modifications therein. It is therefore intended that the following claims cover all such alterations and modifications that nevertheless include the true spirit and scope of the invention.

What is claimed is:

1. A magnetic head for writing data to magnetic media comprising:
   a fist pole;
   a gap layer having a thickness G being formed upon said first pole;
   a seed layer being formed upon said gap layer;
   a second pole being formed upon said seed layer, said second pole having an air bearing surface (ABS) side including a base edge having a width W and two sidewall edges, wherein said base edge is disposed in contact with said seed layer, and wherein each said sidewall edge is formed with an indented portion, such that said ABS surface side of said second pole has a minimal width wv that is less than W at a location away from said base edge, and a width greater than w at a location further away from said base edge than said location of said minimum width.

2. A magnetic head as described in claim 1 wherein w is from 5% to 40% less than W.

3. A magnetic head as described in claim 2 wherein w is approximately 30% less than W.

4. A magnetic head as described in claim 1 wherein the minimum width w of said indented portions are disposed at a distance of from one to five gap layer thicknesses G away from said pole tip base.

5. A magnetic head as described in claim 4 wherein said minimum width w of said indented portions are disposed at approximately two to three gap layer thicknesses G away from said pole tip base.

6. A magnetic head as described in claim 1 wherein said second pole tip has a width W of approximately 0.5 microns, a thickness of approximately 4 microns, indented portions of approximately 0.1 microns per side edge and wherein a point of maximum indentation of each said sidewall edge is located approximately 0.6 microns from said base of said second pole tip.

7. A magnetic head as described in claim 1 wherein said base width W of said second pole tip is approximately 0.28 microns, said second pole tip has a thickness of approximately 3.0 microns, said indented portion of said sidewall edges is approximately 0.05 microns and a point of maximum indentation of each said sidewall edge is approximately 0.6 microns from said second pole tip base.

8. A had disk drive, comprising:
   at least one hard disk being adapted for rotary motion upon a drive device;
   at least one slider device having a slider body portion being adapted to fly over said hard disk;
   a magnetic head being formed on said slider body for writing data on said hard disk, said magnetic head including:
   a first pole;
   a gap layer having a thickness G;
   a seed layer;
   a second pole being formed upon said seed layer, said second pole having an air bearing surface (ABS) side including a base edge having a width W and two sidewall edges, wherein said base edge is disposed in contact with said seed layer, and wherein each said sidewall edge is formed with an indented portion, such that said ABS surface side of said second pole has a minimal width w that is less than W at a location away from said base edge, and a width greater than w at a location further away from said base edge than said location of said minimum width.

9. A hard disk drive as described in claim 8 wherein w is from 5% to 40% less than W.

10. A hard disk drive as described in claim 9 wherein w is approximately 30% less than W.

11. A hard disk drive as described in claim 8 wherein the minimum width w of said necked portion is disposed at a distance of from one to five gap layer thicknesses G away from said pole tip base.

12. A hard disk drive as described in claim 11 wherein said minimum width w of said necked portion is disposed at approximately two to three gap layer thicknesses G away from said pole tip base.

13. A hard disk drive as described in claim 8 wherein said second pole tip has a width W of approximately 0.5 microns, a thickness of approximately 4 microns, a necking of approximately 0.1 microns per side edge and wherein said point of maximum necking is located approximately 0.6 microns from said base of said second pole tip.

14. A hard disk drive as described in claim 8 wherein said base width W of said second pole tip is approximately 0.28 microns, said second pole tip has a thickness of approximately 3.0 microns, said necking of said side edges is approximately 0.05 microns and said point of maximum necking is approximately 0.6 microns from said second pole tip base.

* * * * *